Patented Jan. 26, 1932

1,843,010

UNITED STATES PATENT OFFICE

DONALD B. BRADNER, OF WILMINGTON, DELAWARE, ASSIGNOR TO E. I. DU PONT DE NEMOURS & COMPANY, OF WILMINGTON, DELAWARE, A CORPORATION OF DELAWARE

ANTIFOULING COATING COMPOSITION

No Drawing.   Application filed February 20, 1926. Serial No. 89,757.

This invention relates to toxic coating compositions. More particularly it is concerned with an improvement in antifouling coating compositions for preventing the attachment and growth of marine organisms on under water surfaces and bottoms of ships. The improvement involves the use of a compound of cellulose in the coating material.

The use of antifouling paints for preventing the growth of barnacles and other marine organisms on such structures has been practiced for many years. These paints usually contain a difficulty soluble toxic material such as Paris green, copper oxide or mercuric oxide, which kills the marine organism. The vehicles used in these paints are purposely of such nature that the paints are slowly decomposed by water, shellac or heavy metal soaps being the most common ingredients added for this purpose. This property of slow decomposition in the presence of water has been essential to the proper action of the toxic, since the paint films have been practically impervious to water, and consequently, as soon as the surface layer of toxicant had been dissolved all protective action ceased unless new toxicant was exposed to the water by the decomposition of the paint. It is apparent from the nature of such paints that their life is necessarily very short. As a matter of fact, it seldom exceeds six months of actual use. In an effort to increase this life very thick coatings (1/8" thick) have been applied in some cases, but of course, such a coating is very expensive.

It is the object of the present invention to obviate the above difficulties by preparing a coating composition which is essentially unaffected by water, but which is sufficiently pervious to water to permit the toxic ingredient to be slowly leached out.

In the preparation of such compositions in accordance with my invention I employ, in addition to the toxicant, a cellulose derivative in admixture with a solvent therefor, and preferably more or less gum and softener. Coating compositions comprising such a mixture have the desirable property of forming a film which, although pervious to water, retains its strength in contact therewith.

Moreover, by varying the proportions of gum, cellulose derivative and softener, the permeability of the resulting film may be varied to suit particular conditions of exposure. By increasing the proportion of gum in a given formula the water permeability may be decreased, while by increasing the percentage of softener or cellulose derivative the permeability of the film may be increased. Thus, for example, if a ship is to be protected which is to remain stationary for long periods of time, as is frequently the case with naval vessels, a composition of relatively high permeability from which the toxicant is rapidly leached out may be applied. If, on the other hand, the coating is to be applied to a fast passenger ship, a much less porous coat may be used.

In order to illustrate the improved coating composition, the following example of a preferred formula is furnished. It will be understood that the invention is not limited to the particular ingredients or proportions therein set forth:

1.5% mercuric resinate.
1.5% Paris green.
6.0% pigment.
10.5% low viscosity nitrocellulose.
7.6% resin.
6.5% castor oil.
21.6% butyl acetate.
7.2% butyl alcohol.
8.6% ethyl acetate.
15.0% denatured alcohol.
1.7% acetone.
3.9% methyl alcohol.
8.4% benzene.

It will be understood that other cellulose derivatives than nitrocellulose, such as cellulose acetate or other suitable cellulose esters and ethers, may be employed without departing from my invention. Other gums, solvents and softeners than those shown may, of course, be employed.

Likewise, it will be obvious that other toxic ingredients than those specifically mentioned in the example may be substituted; for example, copper oxide or mercuric oxide. Any suitable pigment as iron oxide may be employed but, if desired, no other pigment than the toxic need be present.

In general, it will be found advisable to first apply an impervious paint to the body to be protected from the marine organisms, in order to prevent corrosion. The anti-fouling composition should be applied as a top coat by spray or other suitable means.

I claim:

1. An article coated with a composition containing a water-soluble toxicant, a cellulosic film-forming material, a softener, and a gum, the cellulosic film-forming material and softener on the one hand, and the gum on the other hand being in such relative proportions that the coating will be permeable to water to a degree sufficient to permit water to leach out the soluble toxicant.

2. An article coated with a composition containing a water-soluble toxicant, a cellulose ester, a softener, and a gum, the ester and softener on the one hand and the gum on the other hand being in such relative proportions that the coating will be permeable to water to a degree sufficient to permit water to leach out the soluble toxicant.

3. An article coated with a composition containing a water-soluble toxicant, a cellulose nitrate, a softener, and a gum, the cellulose nitrate and softener on the one hand, and the gum on the other hand being in such relative proportions that the coating will be permeable to water to a degree sufficient to permit water to leach out the soluble toxicant.

4. An article coated with a composition containing a water-soluble toxicant, a cellulose ester, and a gum, the ester and the gum being in proportions such that the coating will be permeable to water to a degree sufficient to permit of the leaching out of the toxicant.

5. A coating composition comprising a water soluble toxicant, a cellulosic film-forming material, a softener, and a gum, the cellulosic film-forming material and the softener on the one hand, and the gum on the other hand, being in such relative proportions that the composition when applied to a surface will give a coating permeable to water to a degree sufficient to permit water to leach out the soluble toxicant.

6. A coating composition comprising a water soluble toxicant, cellulose nitrate, a softener, and a gum, the cellulose nitrate and the softener on the one hand, and the gum on the other hand, being in such relative proportions that the composition when applied to a surface will give a coating permeable to water to a degree sufficient to permit water to leach out the soluble toxicant.

In testimony whereof I affix my signature.

DONALD B. BRADNER.